May 10, 1966  TOSHIO INOUE  3,250,837
METHOD OF MOLDING INSULATED COILS BY APPLICATION
OF DIFFERENTIAL FLUID PRESSURE
Filed Jan. 15, 1963  2 Sheets-Sheet 1

May 10, 1966 TOSHIO INOUE 3,250,837
METHOD OF MOLDING INSULATED COILS BY APPLICATION
OF DIFFERENTIAL FLUID PRESSURE
Filed Jan. 15, 1963 2 Sheets-Sheet 2

FIG. 2.

(1) FIRST STEP

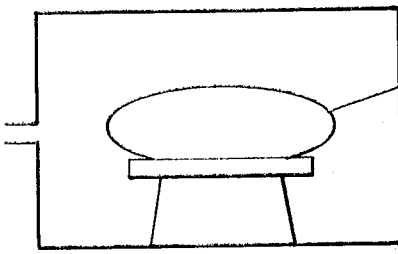

A COIL WITH INSULATING TAPE IS SUBJECTED TO VACUUM DRYING AND DEGASSED.

(2) SECOND STEP — SOLVENTLESS VARNISH

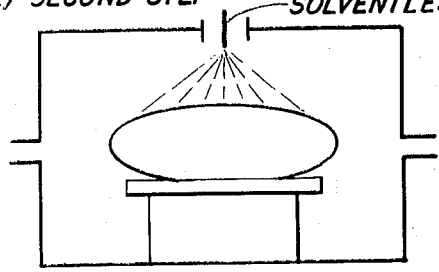

(3) THIRD STEP

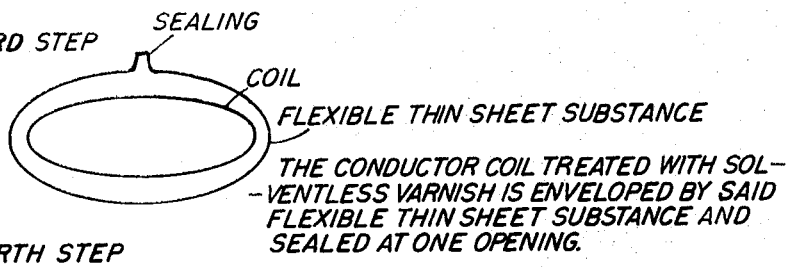

SEALING
COIL
FLEXIBLE THIN SHEET SUBSTANCE

THE CONDUCTOR COIL TREATED WITH SOL-
-VENTLESS VARNISH IS ENVELOPED BY SAID
FLEXIBLE THIN SHEET SUBSTANCE AND
SEALED AT ONE OPENING.

(4) FOURTH STEP

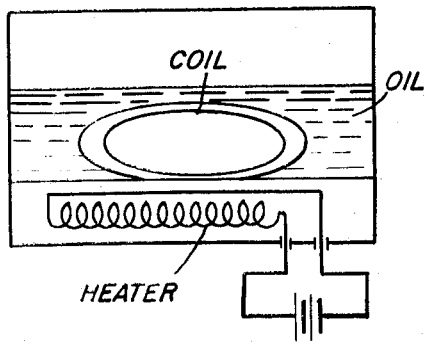

COIL
OIL
HEATER

INVENTOR
TOSHIO INOUE

BY Western & Western

United States Patent Office 3,250,837
Patented May 10, 1966

3,250,837
METHOD OF MOLDING INSULATED COILS BY APPLICATION OF DIFFERENTIAL FLUID PRESSURE
Toshio Inoue, Hitachi-shi, Japan, assignor to Kabushiki Kaisha Hitachi Seisakusho, Tokyo-to, Japan, a joint-stock company of Japan
Filed Jan. 15, 1963, Ser. No. 251,599
Claims priority, application Japan, Jan. 16, 1962, 37/848; Jan. 31, 1962, 37/2,857
3 Claims. (Cl. 264—101)

This invention relates to techniques in molding composite materials, and more particularly it relates to a novel method of molding impregnated materials involving enveloping, with a thin sheet of a substance impermeable to gases, a material impregnated with a solventless varnish, sealing the said thin sheet in a gas-tight manner, and heating the impregnated material to cause it to harden in a pressurized medium.

For a complete understanding of the nature of the present invention and a full appreciation of its principle, objects, and unique worth, the following consideration of prior art is believed to be requisite, particularly in order to distinguish the method of the present invention from other, similar methods.

As is known, the winding of a rotary electrical machine ordinarily consists of a plurality of conductors which have an electrically insulating housing encompassing the entire winding and are insulated from each other by means of a suitable electrically insulating material. A winding for a large-capacity machine is prefabricated and installed in the appropriate slot of the rotary machine, wherefore it is necessary that the winding be of such a form and be installed in such a manner as to fit tightly in its slot. Moreover, the two ends of a winding, that is, one half of the coil, must be so fabricated as to be suitably connected to other windings to form a single coil.

In one known method of fabricating such a coil as stated above, individual conductors sheathed with a thermosetting resin material, that is, windings, are provided with layer separating insulators and stacked in laminate form. Alternatively, it is also possible to insulate the conductor turns by means of various kinds of tapes of known type impregnated or treated with thermosetting resin materials.

In general, a thin film such as a tape of wood wool or glass fiber or some other protective tape is wrapped over the insulating tape, and then the part to be placed into the slot is heated and pressed by a suitable compressing means so as to cause the thermosetting resin to set. However, in order to harden and mold the part which is not to be placed in the slot, that is, the end part of non-linear shape, a commonly used method comprises drying the winding by vacuum drying, then placing the same in a high-temperature liquid such as, for example, asphalt or a bituminous composition, and causing the thermosetting material to harden under pressure applied by the said liquid. In some instances, however, the pressurized liquid for hardening penetrates through the protective tape and mixes with the thermosetting resin material to cause unsuitable hardening of this resin material, or the liquid causes one portion of the insulating material to shift. As a result, the adhesive substances of the wound materials become eroded, whereby such defects as voids are formed.

In order to prevent damage due to infiltration of pressurized liquid into the winding structure, such measures as the use of protective tape and as the molding of the article by means of a special molding press, without the use of a pressurized liquid, have been proposed. However, the method of using protective tape is not satisfactory because of infiltration of liquid through the overlapped parts of the tape into the winding, and the method of using a molding press is disadvantageous because of the difficulty of fabricating a special molding die into which an electrical winding of complicated configuration is to be placed.

Among the methods designed to overcome the above-described disadvantages, there has been proposed a method comprising placing an electrical winding sheathed with a thermosetting material in a flexible, thin-film container which permits passage of vapor but does not permit passage of liquids, providing a porous outer cover over the said container, heating the said winding in a vacuum so as to dry the same, and applying pressure and heat to the said winding to cause its sheathing to harden.

In the case of forming other electrically insulating materials such as, for example, laminated plates and insulating cylinders (laminated tubes), the same problems as in the case of forming electrical windings are faced. Heretofore, the art has endeavored to solve these problems in the same way as in the case of windings.

For example, there are methods wherein the base material to be impregnated is enclosed in a flexible, gas-impermeable bag, the interior of the said bag is evacuated, a degassed thermosetting material is poured into the bag, and the bag is then placed with a pressure-applying and heating the container to cause hardening of the thermosetting material.

All of these methods comprise enclosing the resin material in a flexible, thin sheet bag and causing the said resin to harden by means of a pressure-applying, heating medium, that is they are so-called pressure-molding methods. These methods, however, are disadvantageous in that, by these methods, such steps as vacuum drying and introduction of varnish cannot be accomplished in an easy manner.

The reason for the above difficulty is that, while the principal cause of creation of voids are the gases and liquids contained in the base material, as is well known, the removal of these gases and liquids cannot be thoroughly carried out. In the case of vacuum drying treatment after enclosing a base material or coil in a bag-shaped envelope, the said treatment cannot be satisfactorily and thoroughly accomplished with respect to the interior parts of the articles so treated unless a substantially high vacuum is used. Moreover, even with such a high degree of vacuum, it is almost impossible to achieve the intended objects. Since, as is commonly stated, the degree of thoroughness with which this vacuum drying treatment is carried out has a great effect on the various properties, especially the electrical properties, of the product, it is necessary to carry out this process step with substantial care and thoroughness.

Furthermore, in the above-mentioned method wherein a vacuum-dried base material is placed in a bag, and a varnish is then introduced into the bag, the process step of introducing the varnish is extremely troublesome and, moreover, inefficient. That is, the introduction of varnish uniformly into the interior of the base material enveloped in a bag is extremely difficult, and thorough impregnation cannot be accomplished even under pressure.

It is, therefore, a prime object of the present invention to provide a method of forming impregnated materials wherein vacuum drying can be accomplished easily and thoroughly.

It is another object of the invention to provide such articles as insulated coils and insulating cylinders with highly desirable electrical and mechanical properties through the accomplishment of the above-stated object.

It is a further object of the invention to provide an electrically insulating material resulting from impregnation and hardening of a solventless varnish such as, for example, so-called epoxy varnish and polyester varnish.

The foregoing objects and other objects and advantages, as will become presently apparent, have been achieved by the present invention, which, in its principal aspect, provides a method of molding materials impregnated with solventless varnish, which may be briefly summarized as follows in two parts:

(1) A method of molding insulated coils which comprises, in sequence, vacuum drying an electrical conductor sheathed with an insulating substance in tape or sheet form, introducing a degassed, solventless varnish into the said insulating substance, enveloping the sheathed conductor so prepared with a flexible, thin sheet substance which is impermeable to gases, sealing the said enveloping thin sheet substance, and heating the sheathed conductor so enveloped in a heating fluid, under a pressure of 15 to 2000 kilograms per square centimeter, to cause the said varnish to harden; and (2) A method of molding insulated cylinders which comprises, in sequence, forming insulating layers on a winding core, vacuum drying the cylinder so formed, introducing thereto a degassed, solventless varnish, enveloping the same with a flexible, thin sheet substance which is impermeable to gases, sealing the said thin sheet substance, and heating the cylinder so enveloped in a heating fluid, under a pressure of 15 to 2000 kilograms per square centimeter, to cause the said varnish to harden.

The above-mentioned flexible, thin sheet substance which is impermeable to gases is, of course, required to be a substance having the necessary heat-resistance and is preferably such a substance as, for example, Mylar (trademark for a film of polyethylene terephthalate resin) and Teflon (trademark for tetrafluoroethylene resins).

While various methods of applying wound tape onto the conductor are possible, an insulating tape may be simply wound about the conductor, or an insulating tape may be wound as a solventless varnish is applied thereinto, care being exercised to prevent the inclusion of air and other foreign matter.

As a method of forming insulating layers on a winding core, in the case of an insulating cylinder, layers of paper, fabric, glass fiber fabric, or synthetic fiber fabric, or of a tape of any of these materials are wrapped about the winding core, and varnish is applied thereto by such a method as injecting the varnish, after the wound assembly so produced is vacuum dried, or using a tape as aforesaid with varnish previously applied thereon or winding the fabric material as the varnish is applied thereon and then carrying out vacuum drying.

In the method of this invention, the pressure application condition is selected to be within the range of 15 to 2000 kilograms per square centimeter in order to obtain insulating layers of excellent electrical properties.

As is generally known, in order to prevent the formation of voids due to the hardening shrinkage of varnish, it is necessary to select a varnish of as low a shrinkage rate as possible. However, a varnish which has absolutely no shrinkage is inconceivable, and the possibility of formation of voids cannot be eliminated by ordinary methods. Furthermore, a varnish of low shrinkage rate does not always have excellent electrical and mechanical properties.

By the method of the present invention, however, since high-pressure compression as described above is carried out, surplus varnish rapidly flows into the empty spaces formed by the hardening shrinkage of the varnish, whereby it is possible to prevent fully the creation of voids. Furthermore, with this high pressure it is possible to accomplish thorough compression with respect to the varnish, even when the varnish viscosity increases, and, moreover, it is possible to obtain insulating layers having high adherence.

In order to indicate still more fully the nature, details, and advantageous features of the present invention, the following examples of typical procedure are set forth, it being understood that these examples are presented as illustrative only, and that they are not intended to limit the scope of the invention.

Reference is made to the accompanying drawings, wherein

FIG. 2 is a flowsheet showing the steps and device used in the invention; and

*Example 1*

Figure 1:
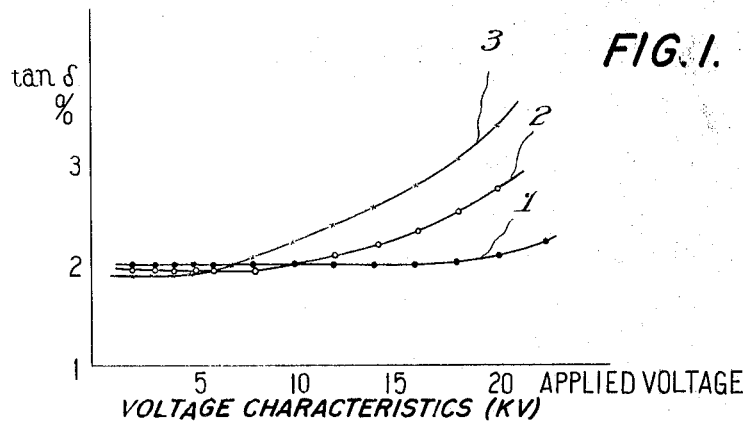
FIG. 1 is a graphical representation showing the variation of the voltage characteristics with impressed voltage.
Figure 3:
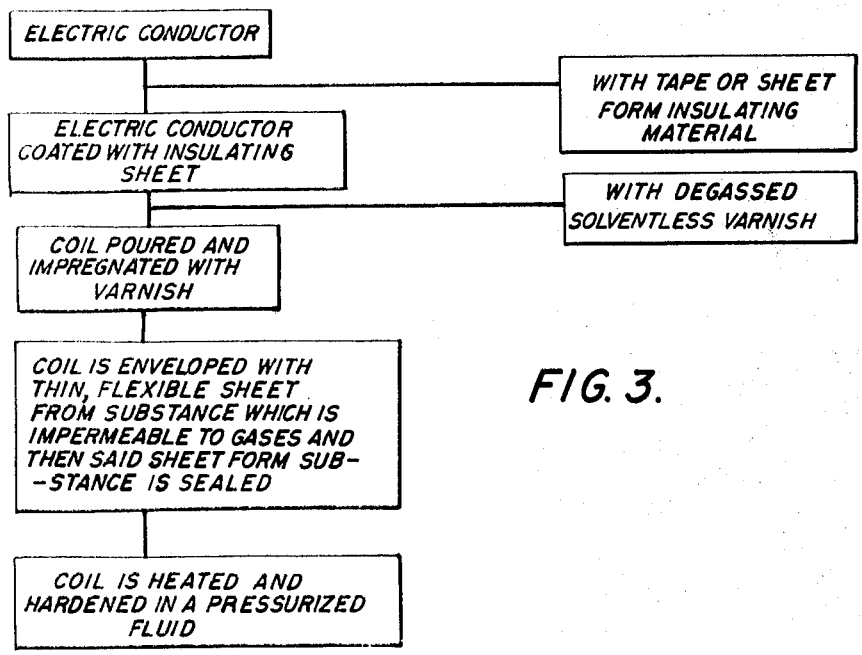
FIG. 3 is a flowsheet indicating the steps of manufacturing an insulating coil.

A coil for a rotary electrical machine insulated with mica tape was vacuum dried, and a degassed, solventless varnish (shrinkage, approximately 20%) was vacuum injected thereinto. The coil so prepared was enveloped with Mylar, which was then sealed. The coil so enveloped was placed in oil and heated and hardened under a pressure of 20 kg./cm.$^2$.

The voltage characteristic (tan $\delta$) of the insulated coil fabricated in the above-described manner is indicated as curve 1 in the accompanying drawing, which is a graphical representation indicating variation of voltage characteristics (in kilovolts) with impressed voltage and indicating also, for comparison, the voltage characteristics of coils fabricated by conventional methods.

The coil corresponding to curve 2 in the drawing, presented as one example for comparison, was vacuum injected with varnish in the same manner as in the method of this invention, then, after sheathing with a shielding material, was caused to harden under a pressure of 7 kg./cm.$^2$. The coil corresponding to curve 3 was fabricated by a method involving pressing by means of a metal die.

As clearly indicated in the graph of the drawing, the characteristic of the coil fabricated according to the present invention is superior. That is, the fact that the variable tan $\delta$ of the curve 1 does not exhibit an appreciable rise for higher voltages indicates that the pertinent coil did not contain such defects as voids and that, moreover, its insulating layers were formed in a highly adherent manner.

*Example 2*

Linter paper was wrapped about a winding core, dried under reduced pressure, then injected and impregnated with epoxy resin varnish to form a starting material for an insulating cylinder. Next, this starting material, together with surplus epoxy resin varnish was enveloped in a Mylar bag, which was then sealed and, together with its sealed contents, was placed in a pressure tank filled with oil. A pressure of 50 kg./cm.$^2$ was then applied and maintained on the work, which was heated for 20 hours at 120 degrees C. to cause hardening of the varnish.

The insulating cylinder formed in the above manner, upon testing, was found to have a breakdown voltage along the laminar direction of over 6.0 kilovolts per millimeter and a breakdown voltage perpendicular to the laminations of over 28 kilovolts per millimeter, both results indicating excellent electrical insulating property.

In comparison, insulating cylinders formed by a conventional method, that is, insulating cylinders hardened without external pressure, were found to exhibit breakdown voltages in the laminar direction of 3.2 kilovolts/mm. or lower and breakdown voltages perpendicular to the laminations of 20 kilovolts/mm. or lower when tested under the same conditions. It will be appreciated, therefore, than the insulating cylinder according to this invention is superior.

As described in the foregoing disclosure, by the practice of the present invention the base material, namely, an insulated coil or an insulating cylinder starting material is enveloped in a thin sheet material, and, before the envelope is sealed, the base material is heated and dried under vacuum beforehand. Accordingly, the treatment of the base material can be accomplished in a thorough manner, in other words, without any trouble whatsoever, wherefore it is possible to obtain a product with substantially improved electrical properties. Furthermore, by selecting the pressurizing condition within a proper range, it is possible to eliminate voids and, moreover, to obtain a product with high adherence.

As will be apparent from the foregoing description, the present invention can be adapted also to such applications as electrical devices having a plurality of electrodes within an insulating cylinder such as, for example, a bushing of capacitor type or the connection of a cable.

Although this invention has been described with respect to a few representative examples of typical procedure, it is not to be so limited as changes and modifications can be made therein which are within the full intended scope of the invention, as defined by the appended claims.

What is claimed is:

1. A method of forming insulated coils which comprises the steps, in the order as named, of vacuum drying an electrical conductor covered with an insulator in sheet form; injecting a degassed solventless varnish therein; enclosing the conductor thus treated with a flexible liquid- and gas-impermeable sheet of a substance selected from the group consisting of polyethylene terephthalate and polytetrafluoroethylene; sealing said sheet; and heating the coils thus enclosed in oil at a pressure of 15 to 2,000 kg./cm.$^2$ thereby causing said coils to harden.

2. A method of forming insulating cylinders which comprises the steps, in the order as named, of forming insulating layers on a winding core; vacuum drying said layers; injecting therein a degassed solventless varnish; enveloping the layers thus prepared in a flexible liquid- and gas-impermeable sheet of a substance selected from the group consisting of polyethylene terephthalate and polytetrafluoroethylene; heating the layers thus prepared and enveloped in oil under a pressure of 15 to 2,000 kg./cm.$^2$, thereby causing said insulating cylinder to harden.

3. In a method of forming insulating coils by covering a conductor with an insulator in sheet form, injecting a degassed solventless varnish therein, and hardening the conductor thus treated, the improvements which comprise vacuum drying said covered conductor prior to injecting said varnish; enveloping the conductor plus varnish with a flexible liquid- and gas-impermeable film sheet selected from the group consisting of polyethylene terephthalate and polytetrafluoroethylene; sealing said film sheet; and heating the coils thus obtained in oil at a pressure of 15 to 2,000 kg./cm.$^2$.

References Cited by the Examiner

UNITED STATES PATENTS

| | | | |
|---|---|---|---|
| 2,479,357 | 8/1949 | Hill et al. | 156—185 |
| 2,550,453 | 4/1951 | Coggeshall | 156—185 |
| 2,922,734 | 1/1960 | Kohn et al. | 156—185 XR |
| 2,951,002 | 8/1960 | Ruscito | 156—184 |

EARL M. BERGERT, *Primary Examiner.*

P. DIER, *Assistant Examiner.*